US007722457B1

(12) United States Patent
Marks et al.

(10) Patent No.: US 7,722,457 B1
(45) Date of Patent: May 25, 2010

(54) METHOD OF PLAYING A SLOT MACHINE ("CUMULATIVE NUMERIC AWARDS")

(75) Inventors: Daniel Mordecai Marks, Washington, DC (US); Anthony Mark Singer, Ringwood, NJ (US); Howard Mitchell Marks, Scarsdale, NJ (US)

(73) Assignee: PTT LLC, Mahwah, NJ (US)

( * ) Notice: Subject to any disclaimer, the term of this patent is extended or adjusted under 35 U.S.C. 154(b) by 1097 days.

(21) Appl. No.: 10/909,021

(22) Filed: Jul. 30, 2004

Related U.S. Application Data

(60) Provisional application No. 60/491,585, filed on Jul. 31, 2003.

(51) Int. Cl.
*A63F 13/00* (2006.01)

(52) U.S. Cl. .............................. 463/20; 463/16; 463/21

(58) Field of Classification Search ............. 463/16–20, 463/21, 22, 26, 31
See application file for complete search history.

(56) References Cited

U.S. PATENT DOCUMENTS 6,328,649 B1 * 12/2001 Randall et al. ................ 463/20
6,443,452 B1 * 9/2002 Brune .................... 273/143 R
6,589,114 B2 * 7/2003 Rose ........................... 463/20
6,733,389 B2 * 5/2004 Webb et al. .................... 463/20
7,070,503 B2 * 7/2006 Rudolph ...................... 463/20
2003/0162585 A1 * 8/2003 Bigelow et al. ............... 463/20
2003/0216165 A1 * 11/2003 Singer et al. .................. 463/20
2004/0048646 A1 * 3/2004 Visocnik ...................... 463/16
2005/0026671 A1 * 2/2005 Baerlocher .................. 463/16

* cited by examiner

*Primary Examiner*—James S McClellan

(57) ABSTRACT

The present invention includes a variety of methods to issue awards during free spins. In general, the present invention involves placing a wager, spinning the slot reels, triggering the free-spin bonus feature, and collecting awards based upon the cumulative numeric value(s) attained over the course of one or more free spins. In a preferred embodiment, a cumulative numeric value starts at zero and increases by the amount shown on "increase value" symbols, with each cumulative numeric value associated with an award. Upon completion of the free spins, the game issues the award associated with the final cumulative numeric value.

6 Claims, 8 Drawing Sheets

METHOD OF PLAYING A SLOT MACHINE ("CUMULATIVE NUMERIC AWARDS")

PRIORITY CLAIM

This application is a non-provisional patent application that claims priority to and the benefit of U.S. Provisional Patent Application Ser. No. 60/491,585, filed on Jul. 31, 2003, incorporated herein by reference.

COPYRIGHT NOTICE

A portion of the disclosure of this patent document contains or may contain material subject to copyright protection. The copyright owner has no objection to the photocopy reproduction of the patent document or the patent disclosure in exactly the form it appears in the Patent and Trademark Office patent file or records, but otherwise reserves all copyright rights.

FIELD OF INVENTION

In general, the present invention relates to methods of pay outs for slot machines and, more particularly, to awards based upon a cumulative numeric value attained over the course of one or more free spins.

BACKGROUND OF THE INVENTION

To play a conventional slot machine, the player deposits money into the machine, sets the wager, and spins the reels. When the reels stop spinning, symbols are displayed and the player collects credits for winning combinations, if any, according to a pay schedule. Since conventional slot machines are limited to the foregoing methods, players, casinos and manufacturers suffer:

Players suffer the boredom of playing games using same method of play; casinos suffer from the players' dissatisfaction with the casino's game selection; casinos cannot distinguish their game offerings from other casinos; and game manufacturers cannot distinguish their product line from other manufacturers.

Casino operators and slot manufacturers, therefore, have developed new methods of playing slot machines to overcome these limitations. One of these methods incorporates free spins of the slot reels. Free spins increase the game's popularity amongst players by enhancing entertainment value and, therefore, increase the game's financial value to the operators and manufacturers.

In known games using free spins, the games only issue awards for winning outcomes on that particular free spin ("single-free-spin awards"). These games do not issue awards for assembling a winning outcome over multiple free spins ("multi-free-spin awards"). As a result, games using single-free-spin awards suffer from three significant disadvantages:

First, awards amounts are limited by the mathematical probabilities of a single spin of the slot reels; second, awards types are limited by the possible outcomes of a single spin of the slot reels; and third, duration of award expectancy is limited to the completion time of a single spin of the slot reels.

Thus, the full potential for free spin games to enhance the value of a slot game remains unrealized.

SUMMARY OF THE INVENTION

The present invention includes a variety of methods to issue multi-free-spin awards based upon the cumulative numeric value(s) attained over the course of one or more free spins. In a preferred embodiment, a cumulative numeric value starts at zero and increases by the amount shown on "increase value" symbols, with each cumulative numeric value associated with an award. Upon completion of the free spins, the game issues the award associated with the cumulative numeric value.

For example: a first free spin displays increase value symbols of +1 and +2 resulting in a cumulative numeric value of 3; a second free spin displays an increase value symbol of +1 resulting in a cumulative numeric value of 4; and a third and final free spin displays increase value symbols of +1 and +1 resulting in cumulative numeric value of 6 and an associated numeric value award of 15× the total bet. A lower cumulative numeric value would have awarded less; a high cumulative numeric value would have awarded more.

BRIEF DESCRIPTION OF THE DRAWINGS

The present invention, including the preferred embodiment summarized above, may be best understood in reference to the accompanying figures and flowcharts.

Figures of a Preferred Embodiment

DETAILED DESCRIPTION OF THE INVENTION

The preferred embodiment of the present invention is played on an upright slot machine device, using a multi-line video slot machine base game, with three "FS" symbols anywhere on the reels triggering the bonus game. More specifically, the embodiment operates, with reference to FIGS. 1-6, as follows:

Description of the Gaming Device

Figure 1:
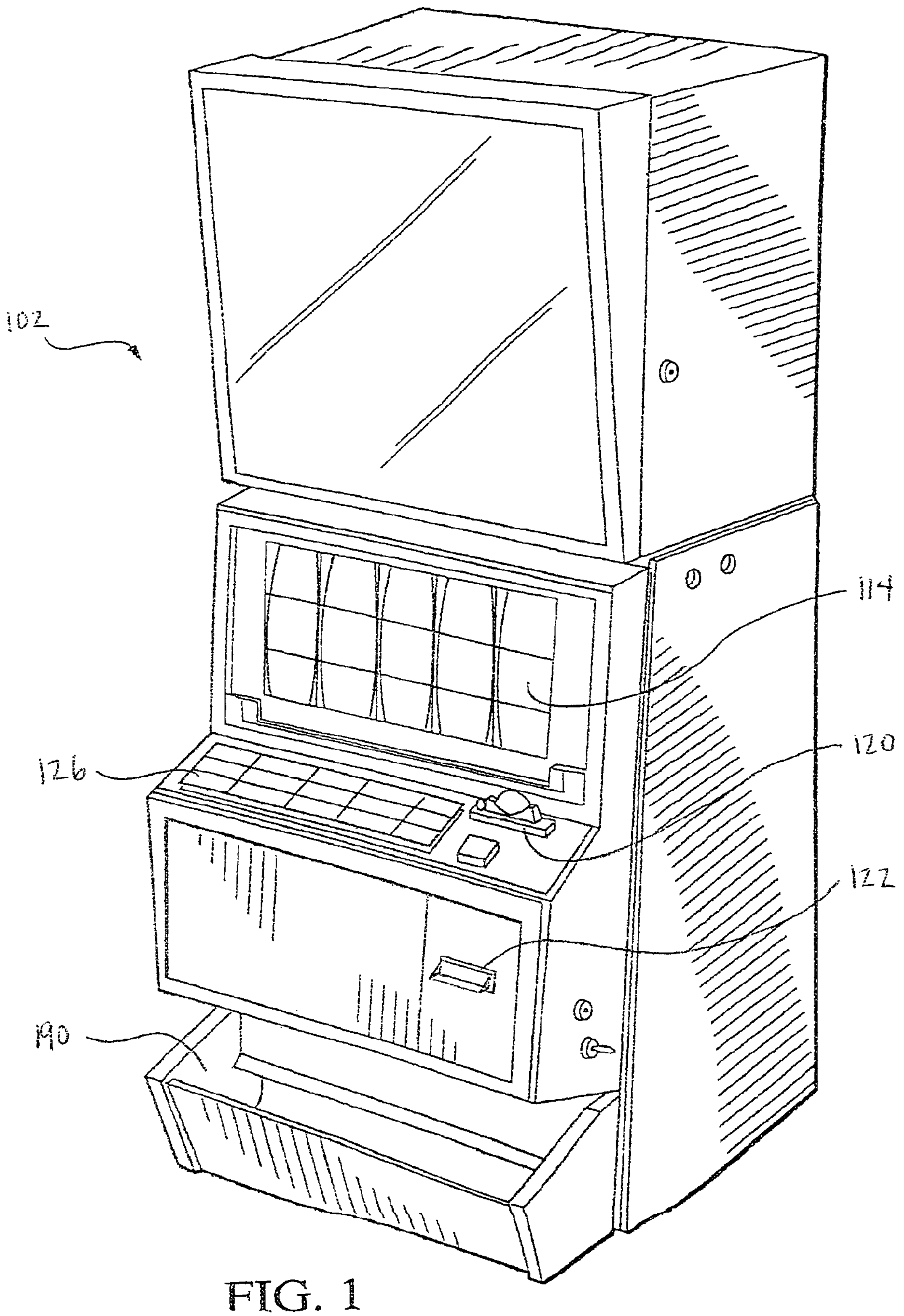
FIG. 1 shows a three-quarter view of an upright slot machine.

The preferred embodiment is played on an upright slot machine 102 including the following components, as shown in FIG. 1: a processor (not shown) that controls the various operations and play of the game; a display area 114 composed a video display device to show the operation of the game and/or other information; a token acceptor 120, bill validator 122, and/or electronic funds transfer device (not shown) to accumulate credits; a button panel 126 to input of wagering, playing, and/or other information; and a tray 190 for collecting tokens, bills or other dispensed objects.

Alternatively, the device may be modified in one or more aspects, including but not limited to the following embodiments. In one embodiment, the device may use any kind of processor, including general purpose CPUs, application specific integrated circuits, hard-wired devices, mechanical device, and/or any combination of these processing units to control the operation, and/or play of the game.

In another embodiment, processing units may work in conjunction with other devices, including: memory for storing data, such as hard drives, ROM, or RAM; cards and controllers for video, audio and mechanical functions; and/or any other processing input, output, display, transmission, and/or storage devices.

In another embodiment, the device may use any method of visual display, including: mechanical devices, such as reels and wheels; LCD; CRT; touch screen LCD or CRT; and/or any combination of these displays.

In another embodiment, the device may use any kind of token acceptor, for any type of token, including coin currency from any country, casino tokens, casino chips, and/or any combination of these coins.

In another embodiment, the device may use any kind of bill validator, for any type of bill, including paper currency from any country, tickets, receipts, and/or any combinations of these bills.

In another embodiment, the device may use any kind of electronic funds transfer device, for any type of funds, including credit cards, debit cards, bank cards, smart cards, and/or any combinations of these funds.

In another embodiment, the present invention may play on any type of device, such as upright, slant top or bar top using video or mechanical displays. Further, a custom apparatus may be built to accommodate the needs of a preferred embodiment.

Description of the Base Game

Figure 2:
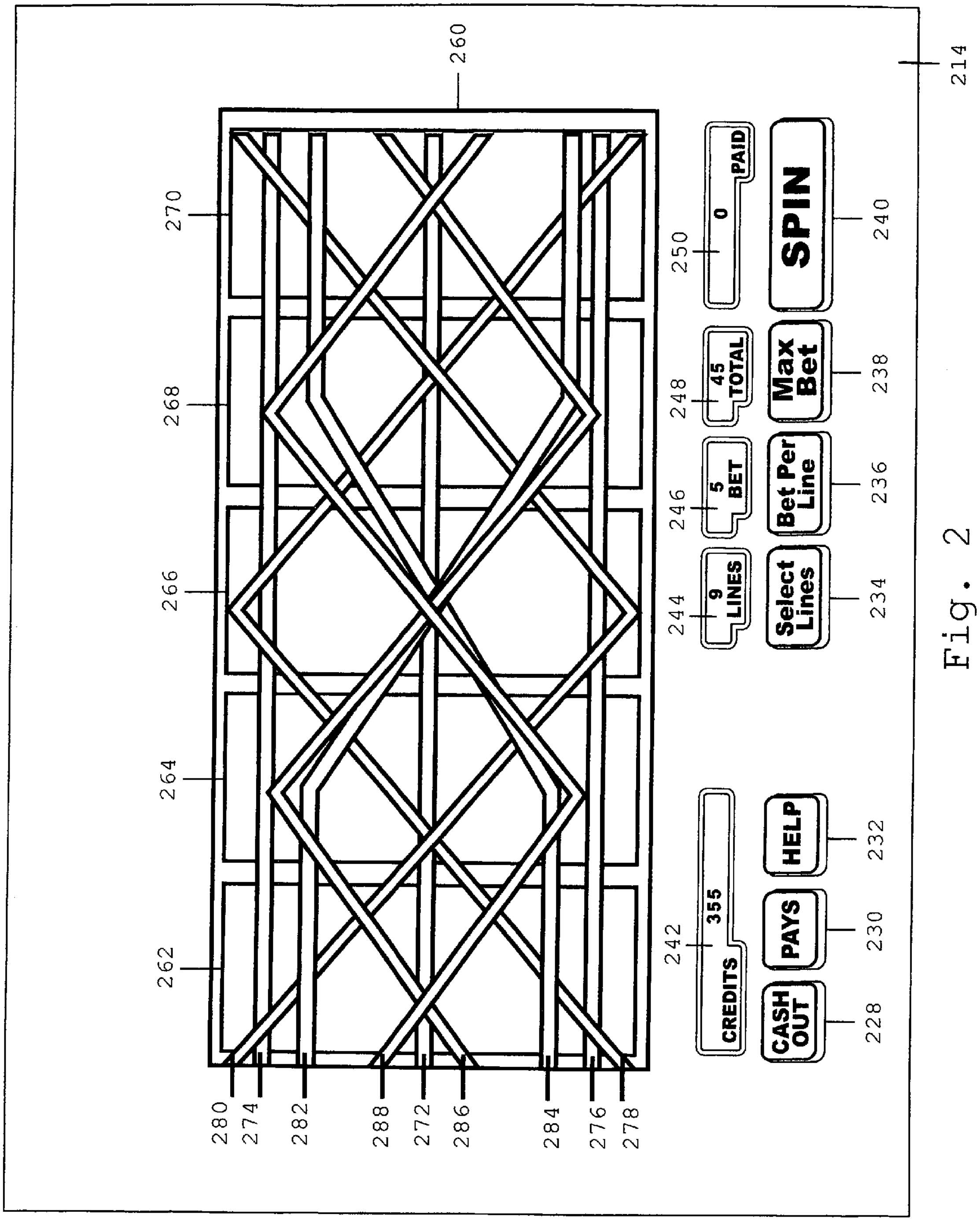
FIG. 2 shows a video display for a multi-payline slot machine.

The preferred embodiment base game includes the following components, as shown in FIG. 2 and, more specifically, displayed on video display screen 214: buttons 228-240, meters 242-250, symbol matrix 260, and pay lines 272-288. In addition, the video display screen 214 may display the title of the game (not shown), special features (not shown), and pay schedule (described below).

Buttons. A set of control buttons 228-240 allows the player to control the functions of the slot game. These buttons include Cash Out 228, Pay Table 230, Help 232, Select Pay Lines 234, Bet Per Line 236, Max Bet 238 and Spin 240, as follows:

- Cash Out button 228 dispenses all credits;
- Pay Table button 230 displays the pay schedule;
- Help button 232 displays the instructions and explanations;
- Select Pay Lines button 234 selects from the number of pay lines;
- Bet Per Line button 236 set the wager per selected pay line;
- Max Bet button 238 selects all of the pay lines, wagers the maximum amount on each of the pay lines, and spins the reels; and
- Spin button 240 spins the reels at any wager level.

Any or all of the control buttons displayed on the video display screen 214 may correspond to buttons hard wired to the apparatus. If necessary, any number of buttons may be displayed to further facilitate control of the game.

Meters. A set of meters 242-250 displays the salient information for the game, including Credits 242, Number of Pay Lines 244, Bet Per Line 246, Total Bet 248, and Paid 250, as follows:

- Credits meter 242 displays the number credits remaining in the credit pool;
- Number of Pay Lines meter 244 is associated with the Select Pay Lines button and displays the current number of Pay Lines Selected;
- Bet Per Line 246 meter is associated with the Bet Per Line button and displays the number of credits wagered per pay line;
- Total Bet 248 meter displays the multiplicative value of the Number of Pay Lines and Bet Per Line; and
- Paid meter 250 displays the number of credits won on the last spin.

Any or all of the meters displayed on the video display screen 214 may correspond to meters hard wired to the apparatus. If necessary, any number of meters may be displayed to further facilitate display of information.

Symbol Matrix. Symbols appear in a symbol matrix 260 comprised of 5-columns by 3-rows, with a first column 262, second column 264, third column 266, fourth column 268 and fifth column 270. Each of the columns 262-270 holds three symbols for a total of 15 symbols. Alternatively, the game could utilize any size symbol matrix, such as 3-columns by 3-rows, holding any number or type of symbols.

Pay Lines. Paylines 272-288 are comprised of specific positions in the symbol matrix 260. For the purposes of this application, symbol positions shall be identified by their column, from left to right, and their row, from top to bottom. For example, symbol position 1/1 is located in the leftmost column, topmost row. The following nine pay lines 272-288 use the following symbol positions and are selected by the player in this order:

- Pay line 1 at 272 uses symbol positions; 1/2, 2/2, 3/2, 4/2, 5/2;
- Pay line 2 at 274 uses symbol positions; 1/1, 2/1, 3/1, 4/1, 5/1;
- Pay line 3 at 276 uses symbol positions; 1/3, 2/3, 3/3, 4/3, 5/3;
- Pay line 4 at 278 uses symbol positions; 1/3, 2/2, 3/1, 4/2, 5/3;
- Pay line 5 at 280 uses symbol positions; 1/1, 2/2, 3/3, 4/2, 5/1;
- Pay line 6 at 282 uses symbol positions; 1/1, 2/1, 3/2, 4/3, 5/3;
- Pay line 7 at 284 uses symbol positions; 1/3, 2/3, 3/2, 4/1, 5/1;
- Pay line 8 at 286 uses symbol positions; 1/2, 2/1, 3/2, 4/3, 5/2; and
- Pay line 9 at 288 uses symbol positions; 1/2, 2/3, 3/2, 4/1, 5/2.

Alternatively, the game may define any number of pay lines, pay lines using any number of symbol positions, pay lines using any location of symbol positions, and/or any order of pay line activation.

Pay Schedule. The pay schedule shown below lists awards that may issue for three types of symbol outcomes: line pays, line scatter pays, and reel scatter pays.

Line pays issue awards for any of the following combinations appearing on a selected pay line starting from the leftmost position on the pay line, as follows:

| | | | | | |
|---|---|---|---|---|---|
| 9-9-9-9-9 | 10000 | 9-9-9-9 | 400 | 9-9-9 | 100 |
| 8-8-8-8-8 | 500 | 8-8-8-8 | 200 | 8-8-8 | 80 |
| 7-7-7-7-7 | 240 | 7-7-7-7 | 120 | 7-7-7 | 60 |
| 6-6-6-6-6 | 160 | 6-6-6-6 | 80 | 6-6-6 | 40 |
| 5-5-5-5-5 | 100 | 5-5-5-5 | 50 | 5-5-5 | 25 |
| 4-4-4-4-4 | 40 | 4-4-4-4 | 20 | 4-4-4 | 10 |
| 3-3-3-3-3 | 40 | 3-3-3-3 | 20 | 3-3-3 | 10 |
| 2-2-2-2-2 | 20 | 2-2-2-2 | 10 | 2-2-2 | 5 |
| 1-1-1-1-1 | 20 | 1-1-1-1 | 10 | 1-1-1 | 5 |

Line scatter pays issue awards for any of the following combinations appearing anywhere—adjacent or non-adjacent—on a payline, as follows:

Any Three "10" symbols . . . 2× bet

Any Four "10" symbols . . . 5× bet

Any Five "10" symbols . . . 20× bet

Reel scatter pays trigger the free-spin bonus game for any of the following combinations appearing anywhere in the symbol matrix, as follows:

Any Three "FS" symbols . . . 5 Free Spins

Any Four "FS" symbols . . . 9 Free Spins

Any Five "FS" symbols . . . 15 Free Spins

Alternatively, a pay schedule may issue awards for any number of same or different symbols, with such symbols appearing in any order and/or in any location on a pay line or in the symbol matrix. Further, the pay schedule may issue any type or amount of award, including: credits, such as a fixed number of credits range of credits, or random amount of credits; a bonus feature, such as a multiplicative factor for credits won; a wild feature, such as wild symbol appearing in a symbol position; one or more free spins of the slot reels, with or without an enhanced pay schedule; cash, products, services; any other award of value; and/or any combination of awards.

Figure 3:
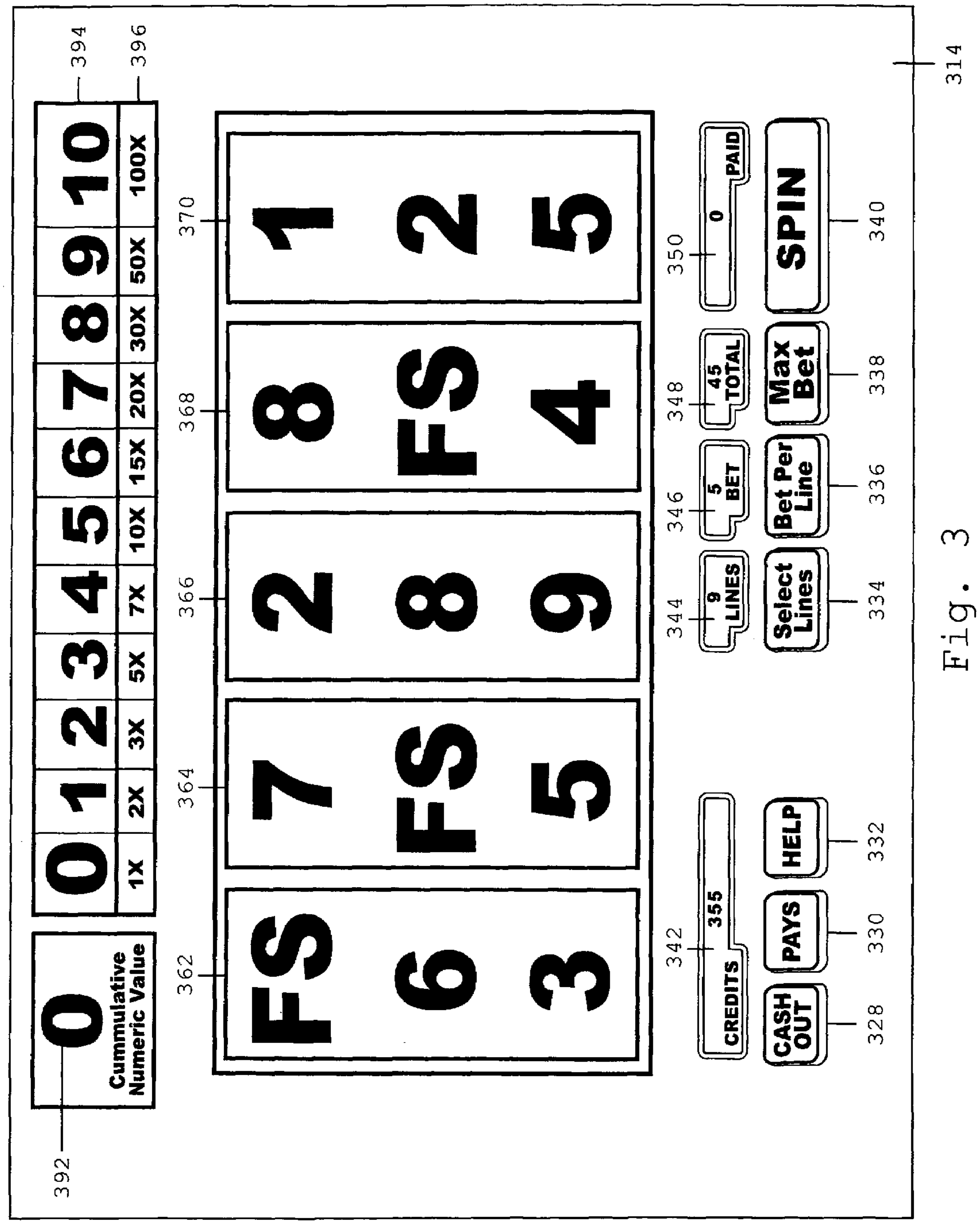
FIG. 3 shows a base game outcome triggering a free spin bonus game, with three free spin trigger symbols ("FS") displayed on the slot reels and cumulative numeric value of zero ("0").

Trigger Event. The base game uses a reel scatter symbol combination as the trigger event—three "FS" symbols anywhere on the slot reels—to start the free-spin bonus game, as shown in FIG. 3 at 362, 364, and 368. Alternatively, the free-spin bonus game may be triggered in any manner, including: any symbol combination on the slot reels; any location of symbols on the slot reels; any amount wagered, won, or lost; any input by the player or third party; at any regular, scheduled, or random intervals; any other unique trigger event; and/or any combination of these events.

Description of the Bonus Game

The preferred embodiment free-spin bonus game issues multi-free-spin awards based upon the cumulative numeric value attained over the course of the free spins, as shown in FIGS. 3-6. In addition, the free-spin bonus game issues single-free-spin line pay and scatter pay awards for winning combinations displayed during the free spins (not shown).

Initial Bonus Screen. In FIG. 3, the initial bonus screen shows 355 available credits, as displayed on the Credits meter 342; 9 selected pay lines, as displayed on the Select Pay Lines meter 344; 5 credits wagered on each of the pay lines, as displayed on the Bet Per Line meter 346; and a total wager of 45 credits, as displayed on the Total Bet meter 348. The spin has produced zero credits at this stage, as displayed on the Paid meter 350.

The initial bonus screen also shows the three FS symbols displayed on slot reels 362, 364, and 368 that triggered the bonus game. During the free spins, all FS symbols on the slot reels convert to increase value symbols "+1," "+2," and/or "+3." Further, the initial bonus screen shows the current cumulative numeric value 392, with the value set to zero, and a list of all possible cumulative numeric values 394, with each numeric value associated with an award of 1× to 100× total bet 396.

Figure 4:
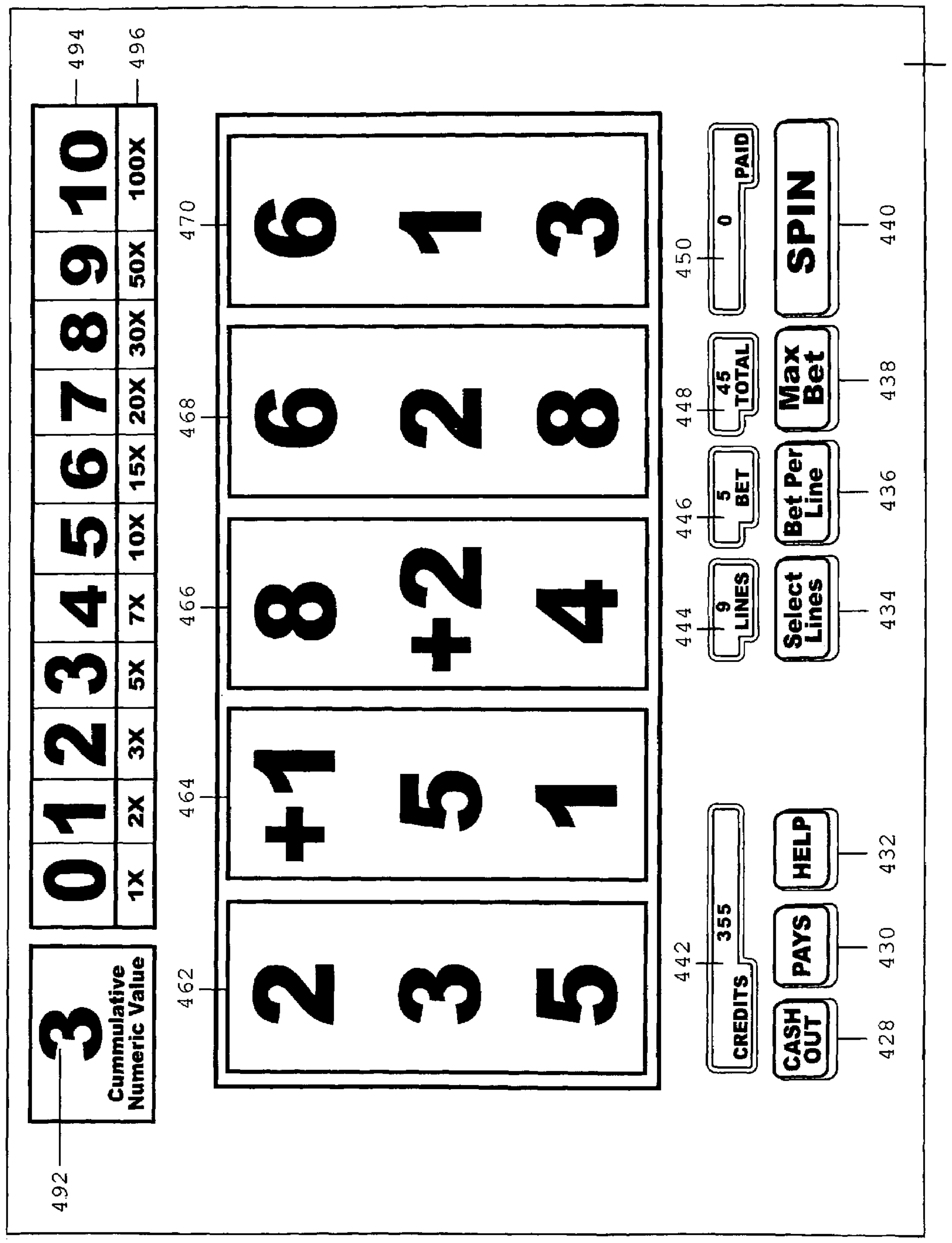
FIG. 4 shows a first free spin outcome, with "+1" and "+2" increase value symbols displayed on the slot reels and cumulative numeric value of three ("3").

First Free Spin. In FIG. 4, the bonus game has completed a first free spin, with "+1" and "+2" symbols displayed on slot reels 464 and 466. The increase value symbols increase the cumulative numeric value 492 from 0, with an associated prize of 1× total bet 496, to 3, with an associated prize of 5× total bet 496. The list of available cumulative numeric values 494 reflects the increase in value by enlarging and highlighting the attained values of 0, 1, 2, and 3 at 494.

Figure 5:
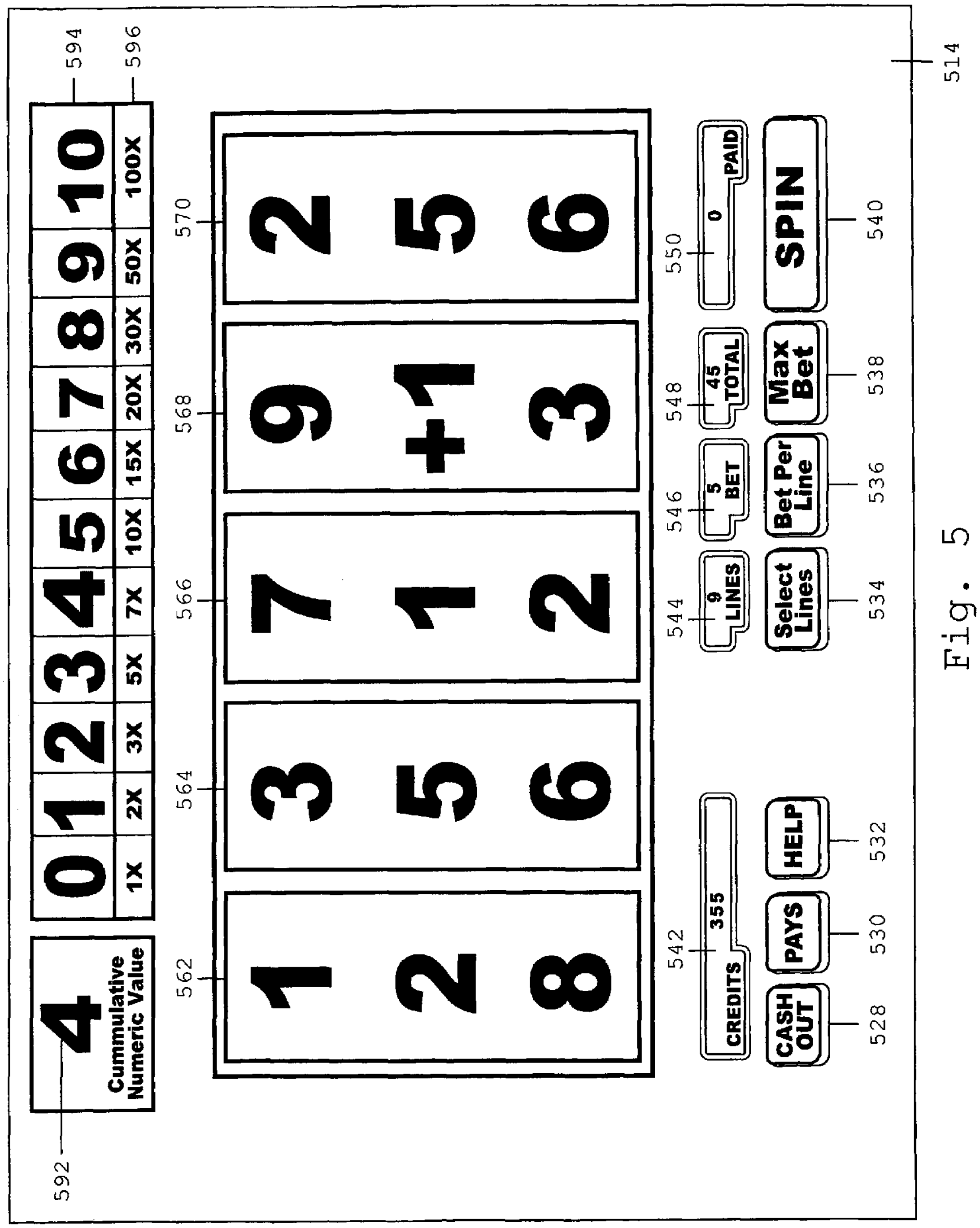
FIG. 5 shows a second free spin outcome, with "+1" increase value symbols displayed on the slot reels and cumulative numeric value of four ("4").

Second Free Spin. In FIG. 5, the bonus game has completed a second free spin, with "+1" symbol displayed on slot reels 568. The increase value symbol increases the cumulative numeric value 592 from 3, with an associated prize of 5× total bet 596, to 4, with an associated prize of 7× total bet 596. The list of available cumulative numeric values 594 reflects the increase in value by enlarging and highlighting the attained values of 0, 1, 2, 3, and 4 at 594.

Figure 6:
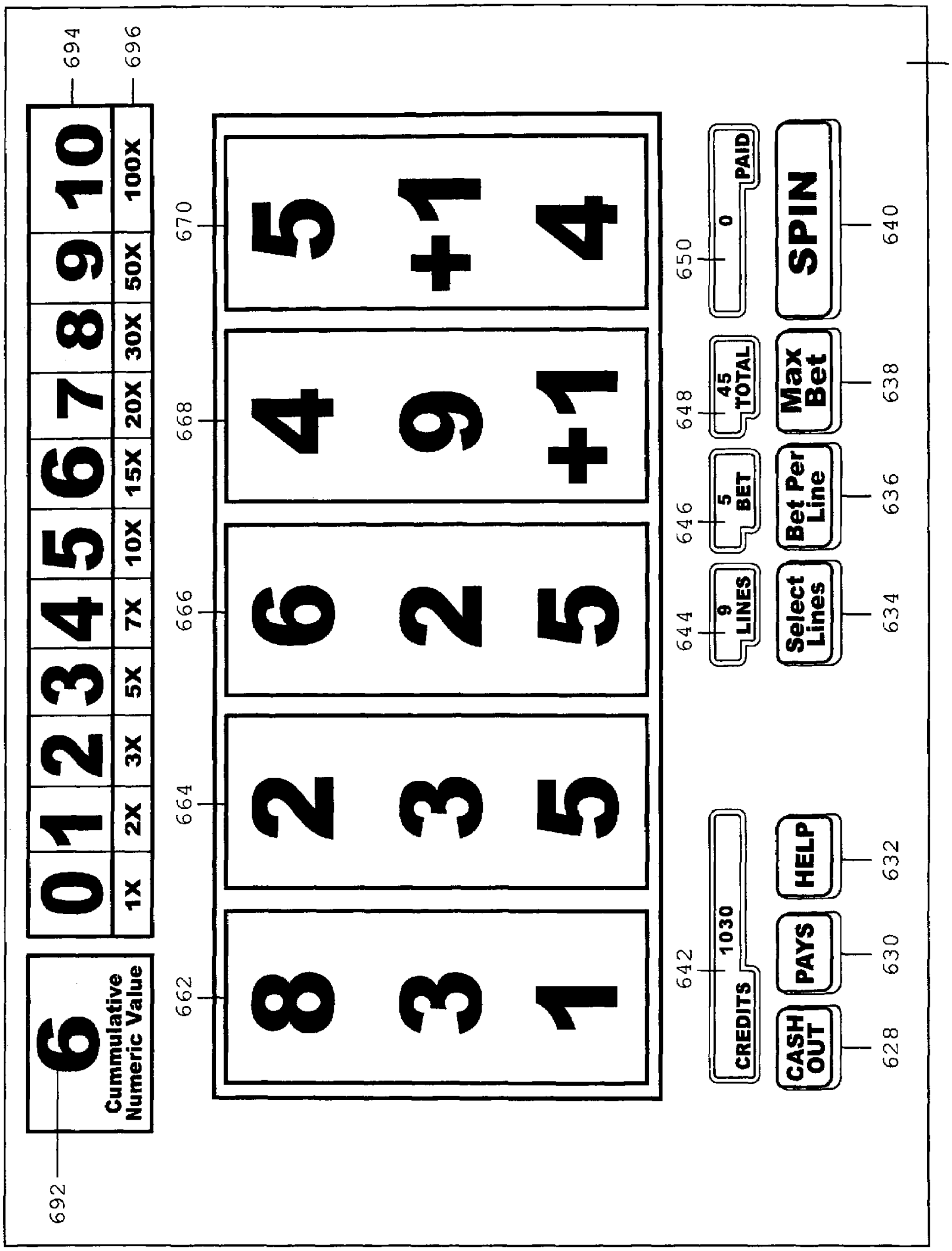
FIG. 6 shows a third free spin outcome, with "+1" and "+1" increase value symbols displayed on the slot reels and cumulative numeric value of six ("6").

Third Free Spin. In FIG. 6, the bonus game has completed a third and final free spin, with "+1" and "+1" symbols displayed on slot reels 668 and 670. The increase value symbols increase the cumulative numeric value 692 from 4, with an associated prize of 7× total bet 696, to 6, with an associated prize of 15× total bet 696. The list of available cumulative numeric values 694 reflects the increase in value by enlarging and highlighting the attained values of 0, 1, 2, 3, 4, 5, and 6 at 694.

Upon completion of the final free spin, the cumulative numeric value 692 of 6 results in a 15× total bet multi-free-spin award of 675, as displayed on the Paid meter 650. The award increases to the player's credit pool to 1,030, as displayed on the Credits meter 642.

Following the completion of the bonus game, the player returns to the base game, as shown in FIG. 3. The cumulative numeric value disappears, the list of possible cumulative numeric values and associated awards above the slot reels 362-370 disappears, and all increase value symbols on the slot reels 362-370 convert to FS symbols. The player may continue to play the base game at the same or different wager level, dispense all 1,030 credits by pressing the Cash Out button 328, view the pay schedules by pressing the Pays button 330, and/or view the game instructions by pressing the Help button 332.

Figure 7:
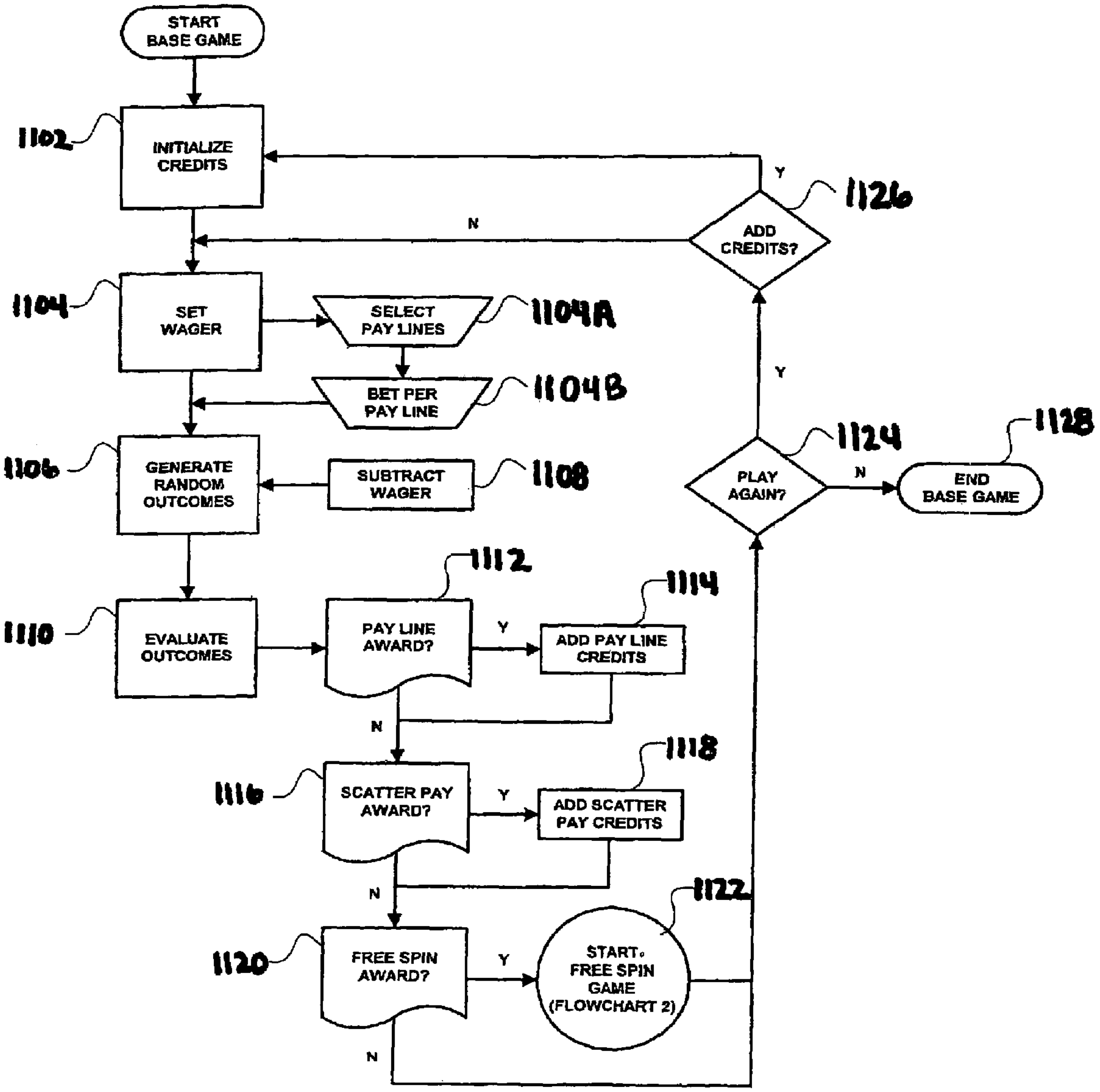
FIG. 7 shows a flowchart diagramming the steps of a preferred embodiment of the present invention.
Figure 8:
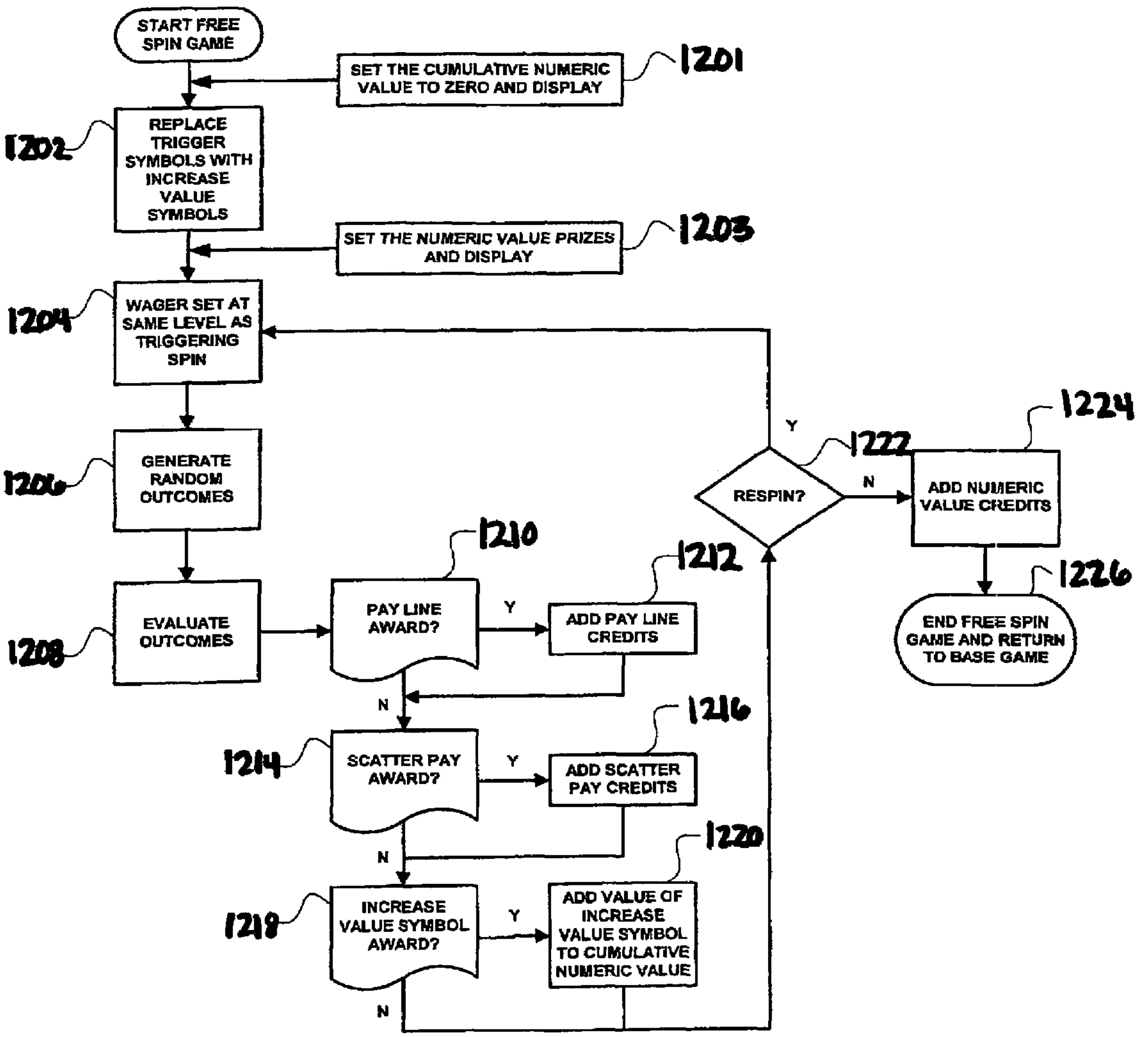
FIG. 8 shows a flowchart diagramming the steps of a preferred embodiment of the present invention.

In addition to the above description, FIGS. 7 and 8 provide flowcharts which further illustrate the operation of a preferred embodiment of the present invention:

FIG. 7 shows the processes used to implement the base game of the preferred embodiment, according to the steps 1102 through 1128, as described below:

At step 1102, the game initializes player credits in accordance with a denomination amount. At step 1104, the wager is set by the player using: 1104(A) the Select Lines button to select one to 20 pay lines and 1104(B) the Bet per Line button to bet one 10 credits bet per pay line. Alternatively, the values from the previous spin may be used again or the maximum wager may be placed using a Bet Max button.

At step 1106, the reels are spun by the player using the Spin Button and, at step 1108, the wager is subtracted from the player's credit total. Spinning the slot reels acts to randomly rearrange the symbols in the symbol matrix and generate winning and/or losing outcomes. At step 1110, the outcomes are evaluated against the pay schedule to determine any pay line, scatter pay credit, or free spin awards.

Pay line awards are determined at step 1112 and, if any such awards exist, the credits are added to the player's total at step 1114. Scatter pay awards are determined at step 116 and, if such awards exist, the credits are added to the player's total at step 1118. Free spin awards are determined at step 1120 and, if such awards exist, the bonus game is awarded at step 1122 and described in Flowchart 2.

Following the conclusion of all outcomes for a round of the game, the player decides if he wants to play again at step 1124. If the player wants to play again, the game determines if there are an adequate number of credits to place the next wager at step 1126. If the credit pool is inadequate, the process player may initialize more credits at step 102; or if the credit pool is adequate, then the player may set the wager at step 1104. If the player does not want to play again, the game ends at step 1128.

FIG. 8 shows the processes used to implement the free-spin bonus game of the preferred embodiment, according to the steps 1202 through 1226 as described below:

At step 1201, the cumulative numeric value is set to zero and displayed. At step 1202, the game replaces the Free Spins (e.g. "FS") trigger symbols on the slot reels with increase value symbols (e.g. "+1," "+2," "+3"). At step 1203, the numeric value prizes are set and displayed.

At step 1204, the wager is set at the same amount as the spin triggering the free spins. At step 1206, the reels automatically spin. At step 1208, the outcomes are evaluated to determine any pay line award, scatter pay award, and/or increase of the cumulative numeric value.

Pay line awards are determined at 1210 and, if any such awards exist, the credits are added to the player's total at step 1212. Scatter pay awards are determined at 1214 and, if such awards exist, then the credits are added to the player's total at step 1216. Increase value symbols are evaluated at step 1218, if any, and the cumulative numeric value is increased by the amount displayed on these increase value symbols.

At step 1222, the game checks for remaining free spins. If there are remaining free spins, the game goes to step 1204. If there are no more free spins, the game issues the award associated with the cumulative numeric value at step 1224. Then the free spin game ends and the player returns to the base game at step 1226.

DESCRIPTION OF ALTERNATIVE EMBODIMENTS

The preferred embodiment of the present invention may be modified in one or more aspects, including but not limited to the following:

Increase Value Symbols. In one embodiment, any type of increase value symbol may be used, including letters, numbers, objects, colors, or shapes. In another embodiment, any number of increase value symbols may be used, from a single symbol to the entire symbol set. In another embodiment, increase value symbols may be indicated to the player in any manner, including highlighting, blinking, enlarging, coloring, and/or any other manner.

In another embodiment, increase value symbols may form other awards, such as line pays, scatter pays or other types of pays or prizes, in addition to acting as increase value symbols. In another embodiment, increase value symbols may act as wild card symbols which help form winning outcomes by replacing some or all of the other symbols in the symbol set.

In another embodiment, increase value symbols may issue any amount of award, including awards of no value, fixed value, variable value, recurring value, and/or any combination of amounts. In another embodiment, increase value symbols may issue any type of award, including single-free-spin and multi-free-awards involving credits, prizes, currency, services, and/or any combination of awards.

In another embodiment, increase value symbols may appear in any pre-determined location to construct a winning outcome, such as one or more specific slot reels, one or more specific positions on the slot reels, one or more variable slot reels, one or more variable specific positions on the slot reels, any reel or position, and/or any combination of locations.

In another embodiment, increase value symbols may increase one or more of the cumulative numeric values by any amount, including a fixed amount, random amount; amount determined by player and/or third party input; amount determined by the wager level, win, and/or loss; and/or any combination of these methods.

In another embodiment, increase value symbols may be placed on the reel strips according to any method, including placing increase value symbols on the reel strips at all times, adding increase value symbol to the reel strips during free spins, replacing pre-determined and/or random symbols with increase value symbols during free spins, and/or any combination of placing increase value symbols on the slot reels.

Cumulative Numeric Values & Awards. In one embodiment, any number of cumulative numeric values may be used, with each value dependent or independent of the other values. In another embodiment, cumulative numeric values may be indicated to the player in any manner, including numbers, letters, objects, colors, and/or any combination of manner. In another embodiment, cumulative numeric values may be emphasized using highlighting, blinking, enlarging, shrinking and/or any other manner.

In another embodiment, cumulative numeric values may be displayed in any location including: inside a symbol; inside the symbol matrix; above, below or along side the symbol matrix; on a separate display; and/or any combination of locations. In addition, cumulative numeric values may be scrolled or moved across the display.

In another embodiment, cumulative numeric values may start at any value and increase and/or decrease to any value, including negative and/or positive integers, fractions, or any other value. In another embodiment, cumulative numeric values may be increased or decreased by any method, including one or more symbols displayed inside the symbol matrix, the number of credits wagered or won, type of winning outcomes, number of winning outcomes, at random, and/or any combination of methods. In another embodiment, each cumulative numeric value, if more than one, may be increased or decreased a differing amount by the same method.

In another embodiment, some or all of the cumulative numeric values attainable during the free spins may be associated with an award, with any method of setting the number of cumulative numeric values with awards and/or the value of such awards, including algorithms using any variables and/or constants, such as amount of wager, number of pay lines, number of reels, number of symbols or increase value symbols.

In another embodiment, awards may issue for cumulative numeric value(s) attained at any point during the free spin(s), including: after each winning outcome within a single free spin; after the summation of all winning outcomes within a single free spin; after the summation of any number of free spins; after all free spins; at any time determined by the game, player, third party; at random intervals; and/or any combination of these times.

In another embodiment, awards may issue for cumulative numeric values exceeding or falling below one or more numeric values, falling within a range between two or more numeric values, and/or any combination of these results. In another embodiment, awards may issue only for a subset of cumulative numeric values selected by the game, player, third party, at random, and/or any combination of these methods.

In another embodiment, cumulative numeric values may issue any amount of award, including awards of no value, fixed amount, recurring payment or service, and/or any combination of amounts. In another embodiment, cumulative numeric values may issue any type of award, including single-free-spin and multi-free-awards involving credits, prizes, currency, services, and/or any combination of awards.

The many features and advantages of the present invention are apparent from the descriptions of the preferred and alternative embodiments. The present invention, however, is not limited to these particular embodiments, as the invention is capable of being practiced and carried out in various ways. For example, new features may be added to an existing embodiment or features from two or more embodiments may be combined to produce a new embodiment. Further, features mentioned in any embodiment may be interchanged with similar features not mentioned that perform the same or similar functions. And, finally, the phraseology and terminology used to explain the embodiments are only descriptive and should not be regarded as limiting. The claims, therefore, seek to cover all features and advantages that fall within the true spirit and scope of the present invention.

We claim:

1. A method of operating an electronic gaming device via a processor, comprising:

the processor operable to accept a wager;

the processor operable to display a symbol matrix formed by a plurality of rows intersecting with a plurality of columns, with the plurality of rows and columns including a plurality of symbols;

the processor operable to set and display numeric values such that:

an adjustable numeric value is set to zero;

a series of fixed numeric values is generated with values greater than zero;

at least one of the said fixed numeric values is associated with a credit award calculated as a multiple of the wager; and at least one of the fixed numeric values greater than the adjustable numeric value is displayed along with any associated credit award at a location outside of the symbol matrix;

a) for a number of iterations, the processor operable to randomly rearrange the entire plurality of symbols and display the rearranged symbols in the symbol matrix;

b) the processor operable to increment the adjustable numeric value based upon the appearance of at least one pre-determined symbol in the symbol matrix;

c) the processor operable to compare the adjustable numeric value to the fixed numeric values during the repetition of steps a) and b); and d) upon completion of said iterations, the processor operable to issue a credit award when the adjustable numeric value equals a fixed numeric value associated with a credit award during the repetition of steps a) and b).

2. A method of claim 1 wherein the processor increments the adjustable numeric value by an amount shown on the pre-determined symbols appearing in the symbol matrix.

3. A method of claim 1 wherein the said number of iterations of steps a) through d) is a fixed number of times.

4. A method of claim 1 wherein the said number of iterations of steps a) through d) is a random number of times.

5. A method of claim 1 wherein the said number of iterations of steps a) through d) is until the player achieves at least a first pre-determined numeric value.

6. A method of claim 1 wherein the said number of iterations of steps a) through d) is until at least a first pre-determined amount of credit awards are issued.

* * * * *